United States Patent
Lai et al.

(10) Patent No.: US 9,218,650 B2
(45) Date of Patent: Dec. 22, 2015

(54) IMAGE PROCESSING METHOD APPLICABLE TO IMAGES CAPTURED BY WIDE-ANGLE ZOOMABLE LENS

(71) Applicant: National Tsing Hua University, Hsinchu (TW)

(72) Inventors: Shang-Hong Lai, Hsinchu (TW); Tung-Ying Lee, Hsinchu (TW); Tzu-Shan Chang, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 115 days.

(21) Appl. No.: 13/914,938

(22) Filed: Jun. 11, 2013

(65) Prior Publication Data
US 2014/0307128 A1 Oct. 16, 2014

(30) Foreign Application Priority Data
Apr. 10, 2013 (TW) .............................. 102112754 A (51) Int. Cl.
H04N 5/232 (2006.01)
G06T 5/00 (2006.01)
H04N 17/00 (2006.01)

(52) U.S. Cl.
CPC .............. *G06T 5/006* (2013.01); *H04N 17/002* (2013.01); *G06T 2207/20061* (2013.01)

(58) Field of Classification Search
CPC ........................... H04N 5/23229; H04N 5/357
See application file for complete search history.

(56) References Cited

U.S. PATENT DOCUMENTS

| 8,052,598 | B2 | 11/2011 | Groszmann | |
|---|---|---|---|---|
| 2005/0013504 | A1* | 1/2005 | Noma | G01C 25/00 382/255 |
| 2010/0004507 | A1 | 1/2010 | Nakano et al. | |
| 2013/0016918 | A1* | 1/2013 | Haribhatt | G06T 5/006 382/275 |
| 2013/0038700 | A1* | 2/2013 | Horita | G02B 7/36 348/47 |
| 2013/0124471 | A1* | 5/2013 | Chen | H04N 5/23238 707/624 |

OTHER PUBLICATIONS

Tung-Ying Lee, et al. Tzu-Shan Chang, Shang-Hong Lai, Kai-Che Liu, Hurng-Sheng Wu, Wide-Angle Distortion Correction by Hough Transform and Gradient Estimation, Visual Communications and Image Processing (VCIP), 2011 IEEE, Nov. 6-9, 2011, 4 pages, Tainan, Taiwan.

* cited by examiner

*Primary Examiner* — Lin Ye
*Assistant Examiner* — John H Morehead, III
(74) *Attorney, Agent, or Firm* — Hauptman Ham, LLP (57) ABSTRACT

An image processing method applicable to images captured by a wide-angle zoomable lens is provided. Said method comprising steps of: A. utilizing the wide-angle zoomable lens to photograph a calibration pattern under a predetermined focal length to obtain a distorted image corresponding to the calibration pattern; B. calculating a distortion parameter for the wide-angle zoomable lens at the predetermined focal length; C. utilizing the wide-angle zoomable lens to photograph an object under another focal length to obtain another distorted image corresponding thereto; D. calculating a new distortion parameter by using the distortion parameter obtained from Step B and a multiple relation between said another focal length and the predetermined focal length; and E. using the new distortion parameter to perform distortion correction on said anther distorted image corresponding to the object. The present invention can perform distortion correction for real-time images captured by the wide-angle zoomable lens.

11 Claims, 5 Drawing Sheets

IMAGE PROCESSING METHOD APPLICABLE TO IMAGES CAPTURED BY WIDE-ANGLE ZOOMABLE LENS

CROSS REFERENCE

This application claims the priority of Taiwan Patent Application No. 102112754, filed on Apr. 10, 2013.

TECHNICAL FIELD OF THE INVENTION

The present invention relates to an image processing method, and more particularly, to a correction and calibration method for images captured by a wide-angle lens.

BACKGROUND OF THE INVENTION

Minimally invasive surgery (MIS) is one of the main evolutions of surgical techniques and it provides great benefits to the patient. For example, this technique reduces patient scars, infection risk, and post-operative morbidity. MIS uses endoscopic camera and instruments manipulated through small incision on the skin to avoid open surgery. However, MIS procedures are more difficult to perform than standard surgery. For example, the field of view of a traditional camera is quite limited compared to human perception. If changed to a wide-angle lens, it introduces image distortion. That is, straight lines become curved in the distorted image. This seriously affects the determination on coordinates of targets and degrades the capability of size and shape determination at the time the surgeon uses the endoscopic camera to perform MIS.

However, it is necessary to use the wide-angle endoscopic camera in MIS since a large field of view is needed such that the surgeon can be aware of each organ status and relative positions of the instruments manipulated during the surgical procedure. Therefore, a way to solve this problem is to convert the distorted images captured by the wide-angle lens into normal images (i.e., undistorted images). In addition, the reconstruction algorithms used in a 3D image reconstruction system are based on the undistorted images. One advantage to converting into the undistorted images is that it is easier to perform 3D reconstruction. The undistorted images are also needed to achieve virtual guidance surgery.

Although there are existing calibration methods for converting the distorted images captured by the wide-angle lens into the normal images (i.e., the undistorted images), there are several problems to apply them to the practical situation. In practice, current endoscope provides 60 Hz frame rate and high definition (HD) resolution. It is almost impossible to achieve real-time image correction by using only one central processing unit (CPU) for the computation. Furthermore, traditional methods are still not feasible for a zoomable lens even though the lens can be calibrated before operation or the surgery. It is because the distortion parameters used for correcting the distorted images will be changed as the focal length of lens is changed.

In conventional skills, for a lens without zooming or changing its focal length, the distortion parameters of the endoscope can be estimated offline but known methods for this need some user intervention. They are manual or semi-automatic, rather than fully automatic. Further, traditional zoom calibration methods have to calibrate the camera for all possible zoom settings so as to obtain corresponding distortion parameters, or need special hardware to get current focal length and radial distortion. These methods are not suitable for calibrating a zoomable endoscopy.

SUMMARY OF THE INVENTION

An objective of the present invention is to provide an image processing method applicable to images captured by a wide-angle zoomable lens, which is capable of performing real-time distortion correction for the images captured by the wide-angle zoomable lens.

To achieve the above objective, the present invention provides an image processing method, which is applicable to images captured by a wide-angle zoomable lens. Said method comprising steps of: A. utilizing the wide-angle zoomable lens to photograph a calibration pattern under a predetermined focal length to obtain a distorted image corresponding to the calibration pattern; B. calculating a distortion parameter for the wide-angle zoomable lens at the predetermined focal length; C. utilizing the wide-angle zoomable lens to photograph an object under another focal length to obtain another distorted image corresponding thereto; D. calculating a new distortion parameter by using the distortion parameter obtained from Step B and a multiple relation between said another focal length and the predetermined focal length; and E. using the new distortion parameter to perform distortion correction on said anther distorted image corresponding to the object.

In accordance with an embodiment of the present invention, in Step D, when said another focal length is r times the predetermined focal length, the new distortion parameter is $1/r^2$ times the distortion parameter obtained from Step B.

In accordance with an embodiment of the present invention, said another focal length is acquired by calculations on said another distorted image corresponding to the object.

In accordance with an embodiment of the present invention, Step B comprises steps of: S1. using an edge-detection mask to extract all edge points in the distorted image; S2. determining a group of candidate parameter sets, which comprises distortion centers and distortion parameters; S3. respectively substituting the candidate parameter sets into a division model for estimating undistorted edge points corresponding to the edge points extracted from Step S1; S4. performing Hough transform to the undistorted edge points estimated by using each of the candidate parameter sets so as to obtain Hough maps; and S5. calculating entropy of the respective Hough maps and seeking out the parameter set with minimum entropy from the candidate parameter sets.

In accordance with an embodiment of the present invention, for the use of each candidate parameter set, Step B further comprises steps of: calculating the gradient at the respective undistorted edge points to figure out orientation of the undistorted edge pints regionally; and removing the edge points that are oriented different from regional orientation of the undistorted edge points, only using the edge points with orientation similar to the regional orientation of the undistorted edge points to vote in Hough space.

In accordance with an embodiment of the present invention, the gradient at the undistorted edge points is calculated by using coordinates of corresponding distorted edge points, the gradient at those distorted points, and the used distortion parameter.

In accordance with an embodiment of the present invention, Step B comprises steps of: T1. using an edge-detection mask to extract all edge points in the distorted image; T2. determining a group of candidate parameter sets, which comprises distortion centers and distortion parameters; T3. respectively substituting the candidate parameter sets into a division model for estimating undistorted edge points corresponding to the edge points extracted from Step T1; T4. performing Hough transform to the undistorted edge points estimated by using each of the candidate parameter sets so as to obtain Hough maps; T5. performing the Hough transform again for the respective Hough maps from Step T4 so as to obtain second-order Hough maps; and T6. calculating entropy of the respective second-order Hough maps and seeking the parameter set with minimum entropy from the candidate parameter sets.

In accordance with an embodiment of the present invention, the calibration pattern is selected from a group consisting of a parallel-line pattern and a chessboard pattern.

In the image correction part, the present invention derives the relationship between the change of focal length and the change of distortion parameters. Therefore, this relationship can be utilized to perform real-time distortion correction for the images captured by the wide-angle zoomable lens, thereby efficiently reducing the computation power consumed in image processing. Moreover, the algorithms used in the calibration part of the present invention can achieve fully-automatic calibration in off-line state, and the obtained distortion parameter is quite precise.

DETAILED DESCRIPTION OF THE INVENTION

The present invention is to process the distorted images captured by a wide-angle lens into normal images (i.e., undistorted images), in order to avoid various disadvantages in the use of the distorted images. Also, the present invention is dedicated to efficiently compensate the wide-angle lens distortion under different zooming conditions or different focal lengths.

In the following, the present invention is illustrated and the content is divided into two parts, i.e., a calibration part and an image correction part. In the calibration part, the wide-angle lens is used to capture one or several images which contain a calibration pattern, and then the distortion parameters of lens are estimated. These distortion parameters can be used to process the original distorted images into undistorted images. However, a zoomable lens or focal length changes will further complicate the problem. In the image correction part, the present invention derives a formula to describe the relationship between the wide-angle distortion and focal length. By utilizing the formula, the image distortion correction in zooming condition becomes easier. Hence, it becomes possible for correcting the real-time distorted images captured by the wide-angle zoomable lens.

The aforesaid calibration is proceeded offline and the image correction is proceeded online That is, before leaving the factory or used to photograph something, the camera is firstly calibrated so as to obtain the distortion parameters for one or several focal lengths. After that, when using the wide-angle zoomable lens to take pictures or record a video, the captured images are corrected in real time.

Figure 1:
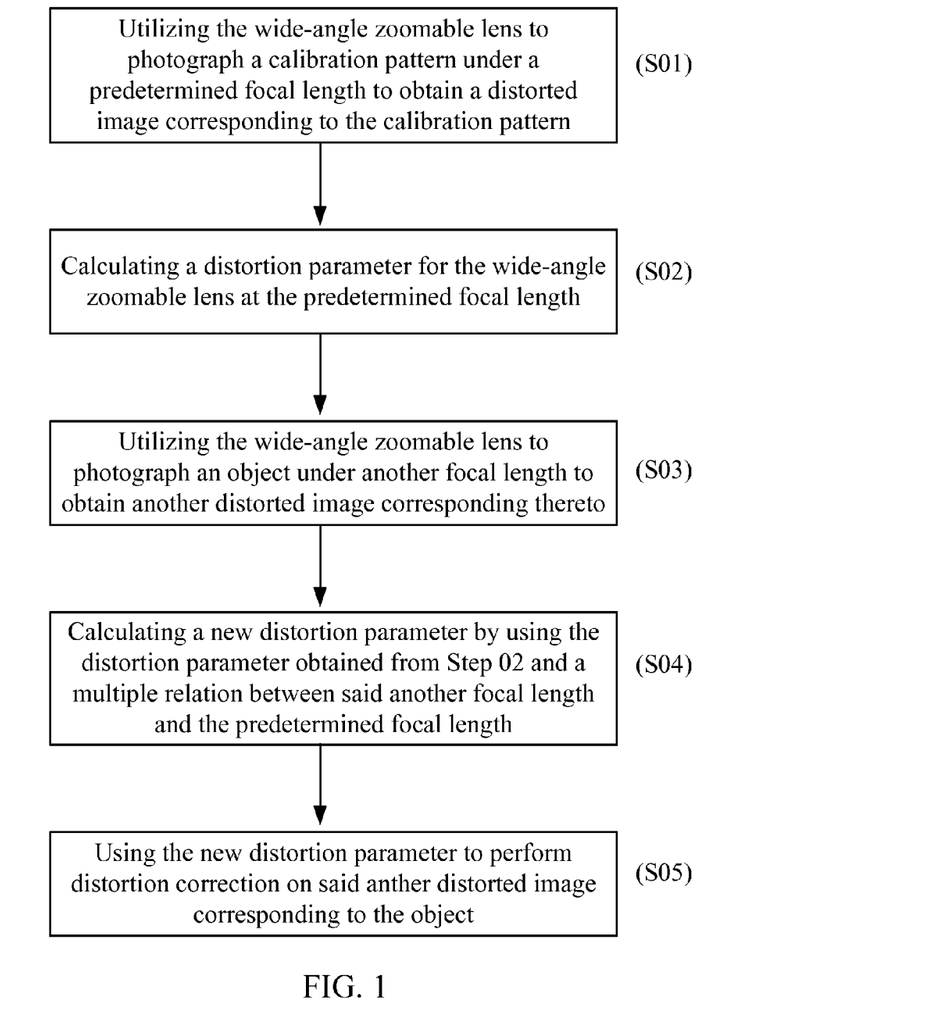
FIG. 1 is a flow chart of a calibration and correction method for images captured by a wide-angle zoomable lens according to the present invention.

FIG. 1 is a flow chart of a calibration and correction method for the images captured by the wide-angle zoomable lens according to the present invention. As shown in FIG. 1, in the calibration part, the wide-angle zoomable lens is firstly used to photograph a calibration pattern under a predetermined focal length to obtain a distorted image corresponding to the calibration pattern (Step S01). Then, distortion parameters for the lens under the predetermined focal length are calculated (Step S02). Next, in the image correction part, the wide-angle zoomable lens is used to photograph an object under another focal length to obtain another distorted image corresponding thereto (Step S03). By using the distortion parameters obtained from Step S02 and a multiple relation between said another focal length and the predetermined focal length, a new distortion parameter are calculated (Step S04). In the end, the new distortion parameter are used to correct said another distorted image corresponding to the object so as to obtain a normal one or a corresponding undistorted image (Step S05).

Optical distortion basically can be classified into two types, i.e., radial distortion and tangential distortion. The radial distortion at a point can be represented by a displacement along the direction of the point to the camera center. The tangential direction is perpendicular to the radial direction. However, low tangential distortion can be compensated by estimating the distortion center. In addition, cameras with fisheye lens are a typical type of wide-angle cameras. The present invention will be detailed by an illustrated an example, i.e., correcting the image distortion for a fisheye camera model. The following will introduce two models commonly used in the standard lens calibration and the fisheye lens calibration, i.e., pin-hole camera model and division model.

A simple pin-hole camera model contains focal length f and assumes that the camera is located at the origin and faces to negative Z-axis. An object location with respect to the camera coordinate is denoted by (X, Y, Z). The corresponding image point is inversely proportional to the depth Z, i.e., $$x = -fX/Z, \; y = -fY/Z \tag{1}$$

The corresponding undistorted coordinate of an distorted image coordinate $x_d = (x_d, y_d)$ is defined by $x_u = (x_u, y_u)$. The division model used to model the optical distortion relates these two coordinates as follows:

$$r_u = r_d/1 + \lambda r_d^2, \; r_u = \|x_u - c\|, \; r_d = \|x_d - c\| \tag{2}$$

where $c = (c_x, c_y)$ is the image center. Equation (2) gives the relationship of distorted radius $r_d$ and undistorted radius $r_u$. According to the division model, it just needs to determine the image center $(c_x, c_y)$ and distortion parameter $\lambda$ such that a distorted image captured by the wide-angle lens can be corrected, or processed into an undistorted one.

Figure 2:
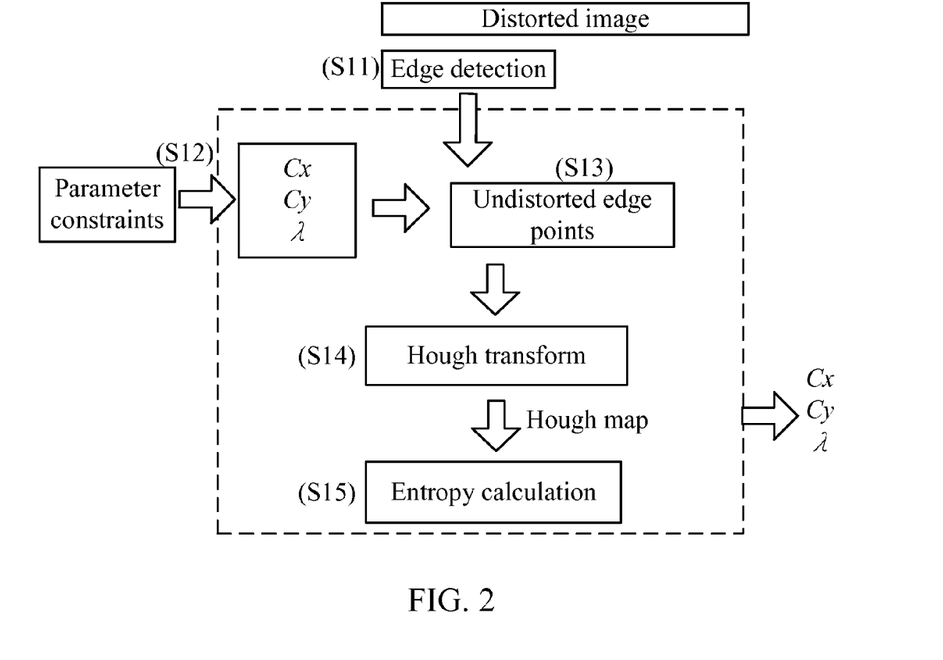
FIG. 2 is a flow chart of calibration on lens according to the present invention.

Accompanying with a flow chart shown in FIG. 2, the following will illustrate the calibration part of the present invention in detail.

Firstly, the wide-angle lens is used to photograph a calibration pattern (e.g., a parallel-line pattern or a chessboard pattern) under a predetermined focal length. The captured image will be a distorted image. Then, all edge points in this distorted image are extracted by using an edge-detection mask (e.g., Canny edge detector) (Step S11). The edge points may mean points lie on the contour of an object in an image. In the example of using the parallel-line pattern, the extracted points are approximately the points falling on distorted straight lines.

Next, a group of candidate parameter sets ($c_x$, $c_y$, $\lambda$) that comprises the distortion centers ($c_x$, $c_y$) and the distortion parameters $\lambda$ are determined from a possible range (i.e., parameter space) (Step S12). That is, it is to select some possible values for the distortion center and possible distortion parameters of the lens. Specifically, the range that the distortion center and the distortion parameter are likely to fall on is set in this step.

In Step S13, these parameter sets are respectively substituted into the division model. For the edge points extracted from Step S11, corresponding undistorted edge points can be estimated by utilizing Equation (2). That is, for each candidate parameter set, all edge points extracted from Step S11 are undistorted as follows:

$$undist(x_d, y_d; c_x, c_y, \lambda) = \left[\frac{x_d - c_x}{1 + \lambda r_d^2} + c_x, \frac{y_d - c_y}{1 + \lambda r_d^2} + C_y\right] \quad (3)$$

In this step, using one candidate parameter set will correspondingly obtain a group of undistorted edge points.

In Step S14, Hough transform is performed to the undistorted edge points so that they are represented in polar form (r, $\theta$). Basically, after the respective points on a straight line are transformed, they give votes in Hough space and the votes form a Hough map. In the Hough map, a point won the most votes can represent the straight line. That is, a straight line may correspond to one point in the Hough map. In this step, each of the candidate parameter sets generates one corresponding Hough map.

Finally, in Step S15, the entropy of each Hough map is calculated. Based on these undistorted points, a normalized Hough map H(r, $\theta$) is obtained by dividing the total number of all votes. The entropy of the normalized Hough map is calculated with the following entropy formula.

$$p(r, \theta) = H(r, \theta)/\Sigma_{\forall i,j} H(i,j)$$

$$entropy(H) = \Sigma_{\forall (r, \theta), s.t. p(r, \theta) \neq 0} -p(r, \theta) \ln p(r, \theta) \quad (4)$$

This step also seeks out the parameter set with the minimum entropy from the candidate parameter sets. This parameter set is the best parameter set. Using this parameter set to correct the distorted image can get the best results. This is because the smaller the entropy of the Hough map is, the more the distribution in Hough map converges to one point. That is, edge points in the undistorted image nearly fit the straight line.

The above approach may make the results degraded because some votes in the Hough space are generated from some orientation not similar to the edge direction. Hence, the present invention derives a gradient estimation formula and just votes the most possible orientation for each edge point.

Figure 3:
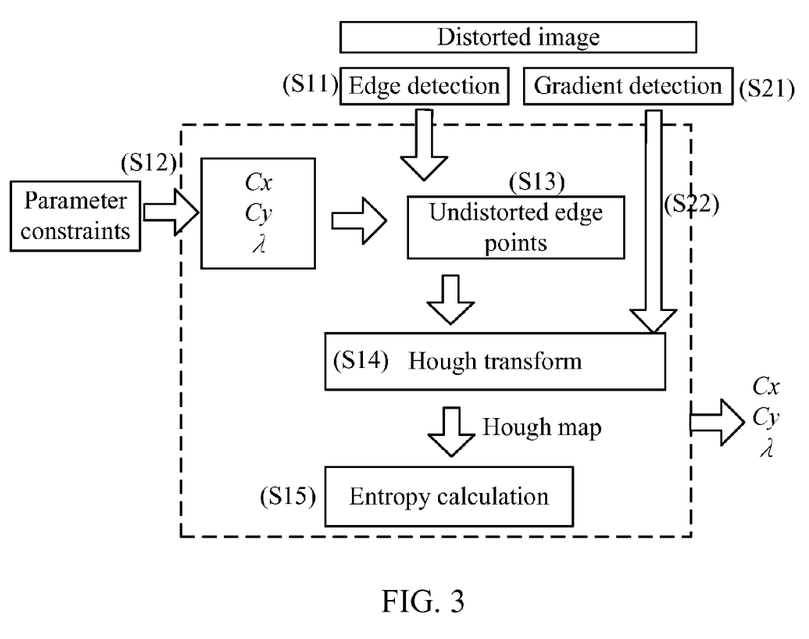
FIG. 3 is another flow chart of calibration on lens according to the present invention.

FIG. 3 is another flow chart of calibration on lens according to the present invention. The differences between FIG. 3 and FIG. 2 are that Step S21 and Step 22 shown in FIG. 3 perform gradient estimation on the edge points and exclude some of the edge points according to gradient differences. In Step S14, Hough transform is not performed to the excluded points.

Specifically, in Step S21, a gradient mask (e.g., Sobel operator) is used to obtain the gradient at respective edge points of the distorted image.

In Step S22, the gradient at the respective undistorted edge points is calculated for figuring out the orientation of the undistorted edge points regionally. The gradient at the undistorted edge points can be calculated by using the coordinates of the corresponding distorted edge points, the gradient at those distorted points, and the utilized distortion parameter.

The detailed derivation is provided below. Next, the edge points oriented different from the regional orientation of the undistorted edge points are removed. Only the edge points with orientation similar to the regional orientation of the undistorted edge points are used to vote in the Hough space. Because there are many candidates in the parameter space to be examined, undistorting a whole image will cost too much computation power. Therefore, in this case, the image gradient estimation is used to simplify the calculation in Hough transform.

The following will introduce a derivation for the gradient at undistorted edge points. The Sobel mask is used to obtain the gradient on each pixel of the distorted image. After that, for the edge point ($x_d$, $y_d$), the normalized gradient on the distorted image is denoted by ($g_x^d$, $g_y^d$). A neighboring point ($x_d^1$, $y_d^1$) along a curved line direction (perpendicular to gradient) is represented by ($x_d$, $y_d$)+$\epsilon$($-g_y^d$, $g_x^d$), where $\epsilon$ is a small number. By using the division model, undistorted positions of these two points can be obtained as follows.

$$r_d'^2 = r_d^2 + \epsilon^2 + 2\epsilon\lfloor(y_d - c_y)g_x^d - (x_d - c_x)g_y^d\rfloor \quad (5)$$

$$x_u' = \frac{x_d' - c_x}{1 + \lambda r_d'^2} + c_x, \quad y_u' = \frac{y_d' - c_y}{1 + \lambda r_d'^2} + c_y \quad (6)$$

The gradient on the undistorted image, ($g_x^u$, $g_y^u$), can be estimated by the following equation.

$$\begin{pmatrix} g_x^u \\ g_y^u \end{pmatrix} \sim \lim_{\epsilon \to 0} \begin{pmatrix} -(y_u' - y_u) \\ x_u' - x_u \end{pmatrix} \quad (7)$$

By letting approach to zero, the gradient estimation formula can be obtained as follows by L'Hospital's Rule.

$$\begin{pmatrix} g_x^u \\ g_y^u \end{pmatrix} \sim \begin{pmatrix} -(\lambda A(y_d - c_y) + g_x^d(1 + \lambda r_d^2)) \\ \lambda A(x_d - c_x) - g_y^d(1 + \lambda r_d^2) \end{pmatrix} \quad (8)$$

where $A := -2\lfloor(y_d - c_y)g_x^{d^3} - (x_d - c_x)g_y^d\rfloor$.

Figure 4:
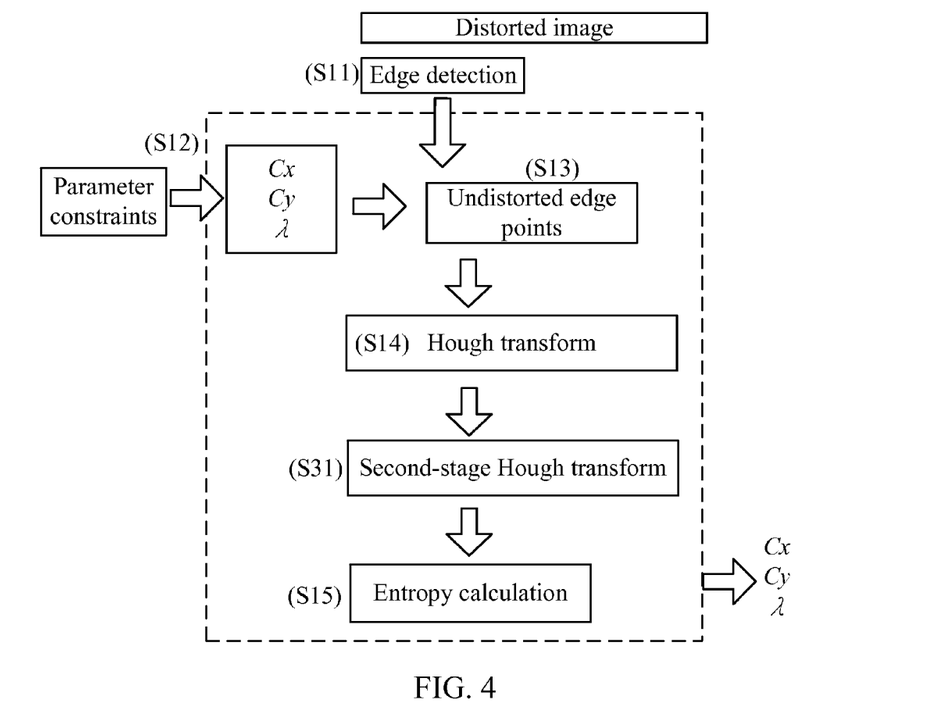
FIG. 4 is still another flow chart of calibration on lens according to the present invention.

FIG. 4 is still another flow chart of calibration on lens according to the present invention. The differences between FIG. 4 and FIG. 2 are that another Hough transform is performed (i.e., Step S31) after the Hough transform performed in Step S14 and the parameter set leading the entropy of a second-order Hough map to a minimum is selected. In this approach, the edge points produced by noise or unrelated curves will be suppressed in the second-order Hough map. This approach is suitable for the case using the parallel-line pattern as the calibration pattern.

Figure 5A:
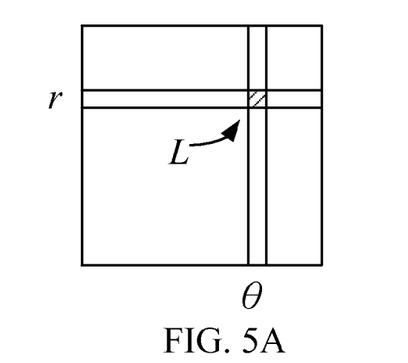
FIGS. 5A to 5C are schematic diagrams showing a two-stage Hough transform in the present invention.
Figure 5B:
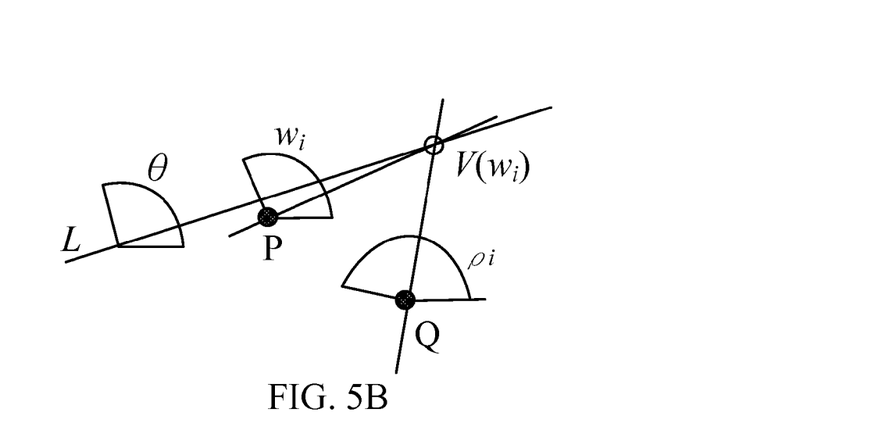
Figure 5C:
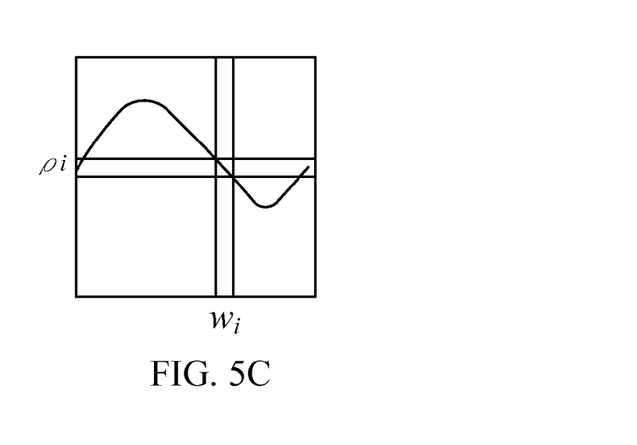

Please refer to FIGS. 5A to 5C. The performance of the second-order Hough map $H_2$ is described as follows. The undistorted lines in the image of the parallel-line pattern are straight but they may not be parallel to one another. A set of parallel lines in 3D space can be represented by a vector [a, b, c]$^T$. The projected version without radial distortion can be represented by a vanishing point V. However, the range of vanishing point is very large, even unbounded. Herein, two points P and Q, i.e., ($x_p$, $y_p$) and ($x_Q$, $y_Q$), can be specified in the undistorted image. The range of orientation is limited within 180 degrees. Hence, the orientations of the two lines PV and QV can be recorded in the second-order Hough map $H_2$.

Given the first-order Hough map $H_1$ (i.e., obtained from Step S14), the voting process is given as follows. A cell in $H_1$ at position (r, θ) represents a line with supporting votes $H_1$(r, θ). A projection can be determined if the angle w is given. For each sample $w_i$, one can construct the line passing through P with orientation $w_i$, i.e., $\rho = x_p \cos w_i + y_p \sin w_i$. The corresponding vanishing point $V(w_i)$ can be calculated by using cross product between two vectors of line in homogeneous coordinates, $[\cos w_i, \sin w_i, -x_p \cos w_i - y_p \sin w_i]^T$ and $[\cos \theta, \sin \theta, r]^T$. The line $V(w_i)Q$ passing through the vanishing point $V(w_i)$ and Q can be calculated by cross product of $V(w_i)$ and Q in the homogeneous coordinates. After the vanishing point is obtained, the corresponding location $(w_i, \rho_i)$ in $H_2$ can be derived as follows.

$$S_{PLP}(r, \theta) = \{(w_i, \rho_i) | \rho_i = \rho(w_i)\}$$

$$r_w(w) = -x_p \cos w_i - y_p \sin w_i$$

$$V(w) = (\cos w_i, \sin w_i, r_w(w)) \times (\cos \theta, \sin \theta, r)$$

$$(vq_1(w), vq_2(w), vq_3(w)) = (x_Q, y_Q, 1) \times V(w)$$

$$\rho(w) = \tan^{-1}(vq_1(w)/vq_2(w)) \quad (9)$$

In this approach, radial parameterization for line is used in the first-order Hough map. In the second-order Hough map, two anchor points are introduced and two relative angles are used instead of the vanishing point. Hence, these two Hough spaces are limited. Based on the transfer function $S_{PLP}$, the line L will contribute $H_1$(r, θ) votes at all locations in $S_{PLP}$. Finally, the entropy of $H_2$ is calculated instead of that of $H_1$.

Next, the following will illustrate the image correction part of the present invention in detail. As described above, the present invention can perform real-time distortion correction for the videos and images captured by the wide-angle lens in zooming condition. Assume the focal length is changed from f to rf (i.e., r times) and the center of camera is stationary. The new projected point $(x_r, y_r)$ satisfied the following equation, and is proportional to focal length.

$$x_r = rfX/Z, \quad y_r = rfY/Z \quad (10)$$

The following will derive the relationship between the change of focal length and the change of distortion parameters. The image J with focal length rf could be approximated by the linearly zoomed version of image I with focal length f. A 3D point X is projected to $x_d^f$ and $x_d^{rf}$ in the image I and J, respectively, and these projected points and their undistorted versions can be well approximated as the following equation.

$$x_d^{rf} = rx_d^f, \quad x_u^{rf} = rx_u^f, \quad r_d^{rf} = rr_d^f \quad (11)$$

Using the afore-mentioned linear approximation leads to the following equation for the division model.

$$x_u^f = \frac{x_d^f}{1 + \lambda_f (r_d^f)^2} \quad (12)$$

Then, the relationship between the change of distortion parameters and the change of focal length can be derived. The distortion parameter is inverse-quadratically proportional to focal length, i.e., $$x_u^{rf} = \frac{x_d^{rf}}{1 + \left(\frac{\lambda_f}{r^2}\right)(r_d^{rf})^2} = > \lambda_{rf} = \frac{\lambda_f}{r^2} \quad (13)$$

Accordingly, the distortion parameter is obtained in the calibration part for the wide-angle lens under the predetermined focal length. After that, when capturing real-time images under another focal length, a new distortion parameter is calculated in the image correction part by using Equation (13), based on the multiple relation between said another focal length and the predetermined focal length. The new distortion parameter is then used to perform the image correction for the distorted image corresponding to a photographing subject such that a normal image or undistorted image corresponding thereto is obtained.

For measuring the focal length during capturing images in real time, it is preferred to obtain that by calculations on the distorted image of the photographing subject. For example, the change of focal length can be obtained by estimating the boundary of the captured image, the size of field of view, or the radius of a labeled circle. In addition, it also can attach a fixed pattern on the lens. The change of focal length can be estimated at the time of capturing real-time images, according to the size or radius variations of the fixed pattern.

Above all, in the image correction part, the present invention derives the relationship between the change of focal length and the change of distortion parameters. Therefore, this relationship can be utilized to perform real-time distortion correction for the images captured by the wide-angle zoomable lens, thereby efficiently reducing the computation power consumed in image processing. Moreover, the algorithms used in the calibration part of the present invention can achieve fully-automatic calibration in off-line state, and the obtained distortion parameter is quite precise.

It is noted that the calibration and image correction method provided in the present invention is also applicable to wide-angle compound lenses with linearly zooming ability in various technical fields, not limited to the endoscopes used in surgery.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An image processing method, which is applicable to images captured by a wide-angle zoomable lens, said method comprising steps of:
   A. utilizing the wide-angle zoomable lens to photograph a calibration pattern under a predetermined focal length to obtain a distorted image corresponding to the calibration pattern;
   B. calculating a distortion parameter for the wide-angle zoomable lens at the predetermined focal length;
   C. utilizing the wide-angle zoomable lens to photograph an object under another focal length to obtain another distorted image corresponding thereto;
   D. calculating a new distortion parameter by using the distortion parameter obtained from Step B and a multiple relation between said another focal length and the predetermined focal length; and E. using the new distortion parameter to perform distortion correction on said anther distorted image corresponding to the object;

wherein in Step D, when said another focal length is r times the predetermined focal length, the new distortion parameter is $1/r^2$ times the distortion parameter obtained from Step B.

2. The image processing method according to claim 1, wherein said another focal length is acquired by calculations on said another distorted image corresponding to the object.

3. The image processing method according to claim 1, wherein Step B comprises steps of:
   S1. using an edge-detection mask to extract all edge points in the distorted image;
   S2. determining a group of candidate parameter sets, which comprises distortion centers and distortion parameters;
   S3. respectively substituting the candidate parameter sets into a division model for estimating undistorted edge points corresponding to the edge points extracted from Step S1;
   S4. performing Hough transform to the undistorted edge points estimated by using each of the candidate parameter sets so as to obtain Hough maps; and
   S5. calculating entropy of the respective Hough maps and seeking out the parameter set with minimum entropy from the candidate parameter sets.

4. The image processing method according to claim 3, wherein for the use of each candidate parameter set, Step B further comprises steps of:
   calculating the gradient at the respective undistorted edge points to figure out orientation of the undistorted edge pints regionally; and
   removing the edge points that are oriented different from regional orientation of the undistorted edge points, only using the edge points with orientation similar to the regional orientation of the undistorted edge points to vote in Hough space.

5. The image processing method according to claim 4, wherein the gradient at the undistorted edge points is calculated by using coordinates of corresponding distorted edge points, the gradient at those distorted points, and the used distortion parameter.

6. The image processing method according to claim 1, wherein Step B comprises steps of:
   T1. using an edge-detection mask to extract all edge points in the distorted image;
   T2. determining a group of candidate parameter sets, which comprises distortion centers and distortion parameters;
   T3. respectively substituting the candidate parameter sets into a division model for estimating undistorted edge points corresponding to the edge points extracted from Step T1;
   T4. performing Hough transform to the undistorted edge points estimated by using each of the candidate parameter sets so as to obtain Hough maps;
   T5. performing the Hough transform again for the respective Hough maps from Step T4 so as to obtain second-order Hough maps; and
   T6. calculating entropy of the respective second-order Hough maps and seeking out the parameter set with minimum entropy from the candidate parameter sets.

7. The image processing method according to claim 1, wherein the calibration pattern is selected from a group consisting of a parallel-line pattern and a chessboard pattern.

8. An image processing method, which is applicable to images captured by a wide-angle zoomable lens, said method comprising steps of:
   A. utilizing the wide-angle zoomable lens to photograph a calibration pattern under a predetermined focal length to obtain a distorted image corresponding to the calibration pattern;
   B. calculating a distortion parameter for the wide-angle zoomable lens at the predetermined focal length;
   C. utilizing the wide-angle zoomable lens to photograph an object under another focal length to obtain another distorted image corresponding thereto;
   D. calculating a new distortion parameter by using the distortion parameter obtained from Step B and a multiple relation between said another focal length and the predetermined focal length; and
   E. using the new distortion parameter to perform distortion correction on said anther distorted image corresponding to the object;
   wherein Step B comprises steps of:
      S1. using an edge-detection mask to extract all edge points in the distorted image;
      S2. determining a group of candidate parameter sets, which comprises distortion centers and distortion parameters;
      S3. respectively substituting the candidate parameter sets into a division model for estimating undistorted edge points corresponding to the edge points extracted from Step S1;
      S4. performing Hough transform to the undistorted edge points estimated by using each of the candidate parameter sets so as to obtain Hough maps; and
      S5. calculating entropy of the respective Hough maps and seeking out the parameter set with minimum entropy from the candidate parameter sets.

9. The image processing method according to claim 8, wherein for the use of each candidate parameter set, Step B further comprises steps of:
   calculating the gradient at the respective undistorted edge points to figure out orientation of the undistorted edge pints regionally; and
   removing the edge points that are oriented different from regional orientation of the undistorted edge points, only using the edge points with orientation similar to the regional orientation of the undistorted edge points to vote in Hough space.

10. The image processing method according to claim 9, wherein the gradient at the undistorted edge points is calculated by using coordinates of corresponding distorted edge points, the gradient at those distorted points, and the used distortion parameter.

11. An image processing method, which is applicable to images captured by a wide-angle zoomable lens, said method comprising steps of:
   A. utilizing the wide-angle zoomable lens to photograph a calibration pattern under a predetermined focal length to obtain a distorted image corresponding to the calibration pattern;
   B. calculating a distortion parameter for the wide-angle zoomable lens at the predetermined focal length;
   C. utilizing the wide-angle zoomable lens to photograph an object under another focal length to obtain another distorted image corresponding thereto;
   D. calculating a new distortion parameter by using the distortion parameter obtained from Step B and a multiple relation between said another focal length and the predetermined focal length; and E. using the new distortion parameter to perform distortion correction on said anther distorted image corresponding to the object;

wherein Step B comprises steps of:

T1. using an edge-detection mask to extract all edge points in the distorted image;

T2. determining a group of candidate parameter sets, which comprises distortion centers and distortion parameters;

T3. respectively substituting the candidate parameter sets into a division model for estimating undistorted edge points corresponding to the edge points extracted from Step T1;

T4. performing Hough transform to the undistorted edge points estimated by using each of the candidate parameter sets so as to obtain Hough maps;

T5. performing the Hough transform again for the respective Hough maps from Step T4 so as to obtain second-order Hough maps; and T6. calculating entropy of the respective second-order Hough maps and seeking out the parameter set with minimum entropy from the candidate parameter sets.

* * * * *